No. 736,526. PATENTED AUG. 18, 1903.
P. C. KNUTSON.
CORN SHOCKER.
APPLICATION FILED AUG. 23, 1902.
NO MODEL.

Fig. 2.
Fig. 4.
Fig. 3.
Fig. 1.

Witnesses
Emily F. Camp
A. J. Smoot

Inventor
Peter C. Knutson
By Milo B. Stevens & Co.
Attorneys

THE NORRIS PETERS CO., PHOTO-LITHO., WASHINGTON, D. C.

No. 736,526. Patented August 18, 1903.

UNITED STATES PATENT OFFICE.

PETER CHRISTIAN KNUTSON, OF DIAMOND BLUFF, WISCONSIN.

CORN-SHOCKER.

SPECIFICATION forming part of Letters Patent No. 736,526, dated August 18, 1903.

Application filed August 23, 1902. Serial No. 120,826. (No model.)

*To all whom it may concern:*

Be it known that I, PETER CHRISTIAN KNUTSON, a citizen of the United States, residing at Diamond Bluff, in the county of Pierce and State of Wisconsin, have invented certain new and useful Improvements in Corn-Shockers; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in corn-shockers, and has for its object a simple and effective device of this character. It comprises a portable post, adapted to be driven into the ground, carrying a vertically-adjustable frame against which the cornstalks are placed and held while they are being tied together to form a shock.

Improved details in the construction and arrangement of the several parts of my invention will be apparent from the detailed description hereinafter and the appended claims when taken in connection with the accompanying drawings, forming part hereof, in which—

Figure 1 is a front elevation. Fig. 2 is a top plan. Fig. 3 is a side elevation showing the position of the parts before the stalks are compressed. Fig. 4 is a side elevation showing the stalks compressed and ready to be tied.

Referring specifically to the drawings, 5 indicates a post, the lower end of which is pointed, as at $5^a$, and is also faced with metal to increase its wearing capacity. The upper end is provided with a suitable handle portion $5^b$. A frame 6, comprising side pieces $6^a$, is slidingly mounted on the post 5. This frame carries the stalk-holder 7, against which the cornstalks are placed. The said holder comprises two superposed concave arms $7^a$, spaced apart by and secured to the reduced portions $6^b$ of the side pieces $6^a$. The said side pieces $6^a$ also have pivoted therein, as at $8^a$, a hand-lever 8, carrying a transverse bar 9, near the respective ends of which I provide apertures 10, in which are fastened the cords 11 and 12. The cord 11 is provided at its end with a hook $11^a$, and the cord 12 is provided with a number of knots $12^a$. The downward movement of the lever 8 is limited by a stop $6^c$, secured to the side pieces $6^a$. The frame 6 is vertically adjustable on the post 5, the same being provided with apertures $5^b$, through which a pin $5^c$ passes. By removing the pin the frame may be shifted up or down on the post to any desired position and held there by again inserting the pin. Guides $7^b$ for the cords 11 and 12 are secured between the concave pieces $7^a$, near the ends thereof. A box 13 for carrying a ball of twine 14 is secured to the post 5. The said box is provided with a hinged cover $13^a$, the twine passing through a hole therein and is guided to a convenient position near the stalks by an eye or staple 15, through which it passes. A knife 16 is secured to the frame 7, by means of which the twine may be cut after the stalks are tied. To sustain the thrust of the lever 8, I employ a brace 17, secured to the side pieces $6^a$, which abuts against the post 5.

The operation of my device is as follows: The post 5 is driven into the ground and the frame 6 adjusted to the height desired. The cornstalks are then placed against the concave holder 7. The cords 11 and 12 are then placed around the stalks, passing over the guides $7^b$, the ends being fastened together by means of the hook $11^a$, engaging one of the knots $12^a$. The hand-lever is now pressed down, as shown in Fig. 4, which tightens the cords 11 and 12 and draws the stalks together. They are now ready to be tied by the twine 14, which is then severed by the knife 16. After the stalks are tied the lever 8 is raised, which loosens the cords 11 and 12 and enables them to be unhooked. The shock can then be removed and the operation repeated, or they may be left standing and the device removed to form another shock.

Having thus described my invention, what is claimed as new, and desired to be secured by Letters Patent, is—

1. A corn-shocker comprising a portable post, a stalk-holding frame adjustable vertically thereon, a lever pivoted to the frame, and releasable means operated by the lever for compressing the stalks preparatory to binding, substantially as shown and described.

2. A corn-shocker comprising a portable post, a stalk-holding frame thereon, a lever pivoted to the frame, a rope connected to and operated by the lever for compressing the stalks against the frame preparatory to binding, and a stop on the frame for limiting the downward movement of the lever, substantially as shown and described.

3. A corn-shocker comprising a portable post, a stalk-holding frame thereon, a lever pivoted to the frame, a rope connected to and operated by the lever for compressing the stalks against the frame preparatory to binding, and a knife projecting from the frame and adapted to cut the twine when the shock is removed, substantially as shown and described.

In testimony whereof I affix my signature in presence of two witnesses.

PETER CHRISTIAN KNUTSON.

Witnesses:
  O. J. HOHLE,
  L. G. SPINNEY.